Aug. 4, 1931. E. L. CROZIER Re. 18,143

AEROPLANE

Original Filed July 30, 1923 2 Sheets-Sheet 1

Witnesses:
H. L. Fox.

E. L. Crozier,
Inventor

Clarence O'Brien
Attorney

Aug. 4, 1931. E. L. CROZIER Re. 18,143

AEROPLANE

Original Filed July 30, 1923 2 Sheets-Sheet 2

Witnesses:
F. L. Fox.

E. L. Crozier,
Inventor

By Clarence A. O'Brien
Attorney

Reissued Aug. 4, 1931 Re. 18,143

UNITED STATES PATENT OFFICE

ELMER L. CROZIER, OF BIRMINGHAM, ALABAMA

AEROPLANE

Original No. 1,471,327, dated October 23, 1923, Serial No. 654,580, filed July 30, 1923. Application for reissue filed May 29, 1931. Serial No. 541,056.

This invention relates to certain new and useful improvements in aeroplanes, and has particular reference to devices of this kind embodying two planes and commonly known as bi-planes.

The primary object of the invention is to generally simplify and improve devices of the above kind whereby the same may be made more durable in construction and compact in arrangement of parts.

Another object of the invention is to provide efficient form and arrangement of planes arranged longitudinally of the fuselage instead of the commonly employed lateral planes or wings now in use, the construction and form of which necessarily involves frailty of construction.

Other objects will appear as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a view in side elevation of an aeroplane constructed in accordance with the present invention.

Referring more in detail to the drawings, the device embodies a main or passenger carrying fuselage 5 provided with a suitable landing gear 6 and resilient ground engaging tail member 7 for retarding the forward movement of the aeroplane upon making a landing.

Figure 1:
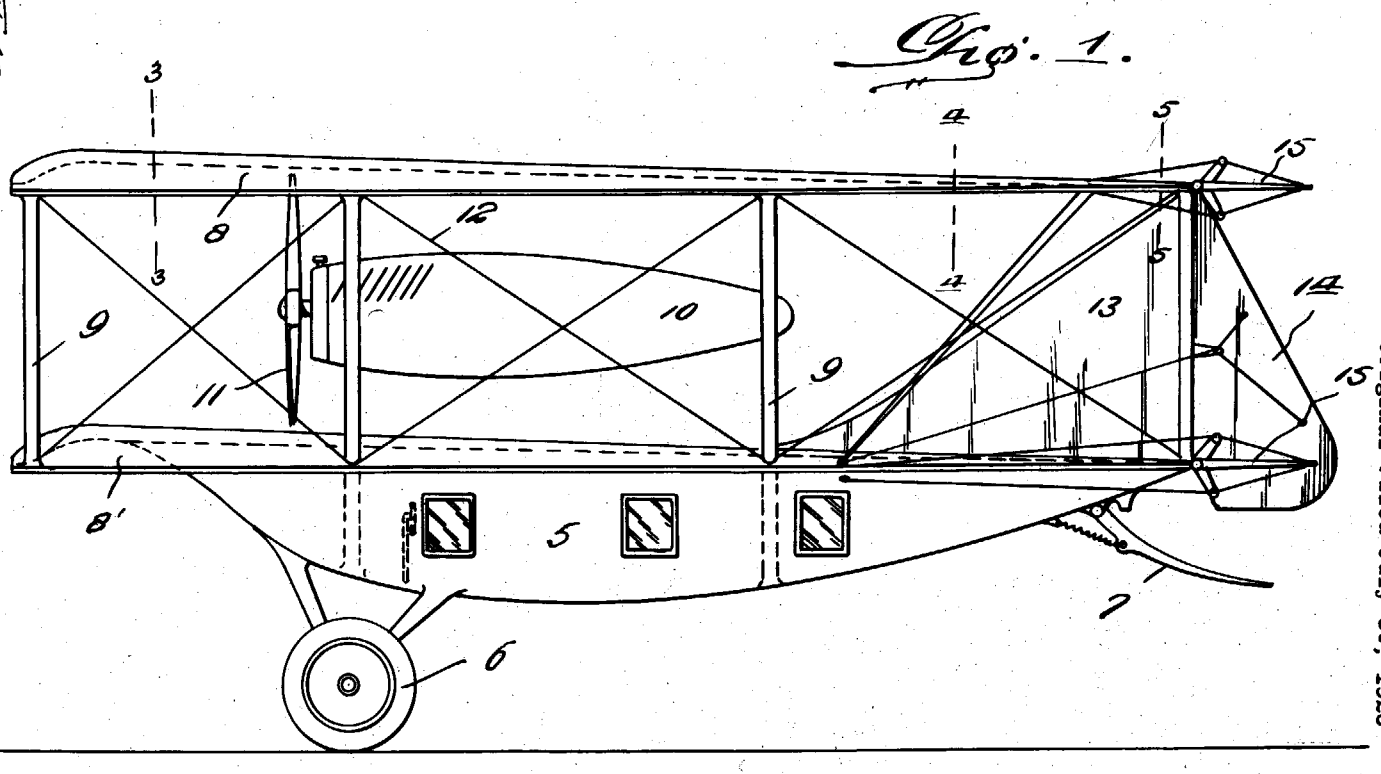

In accordance with the present invention, a pair of superimposed longitudinal planes 8′ and 8 are provided, the plane 8′ being somewhat wider than the fuselage 5 and rigidly constructed on the top of the latter as shown in Figure 1, and the upper plane 8 being somewhat wider than the lower plane 8′. The planes are rigidly connected and supported in spaced relation by means of suitable struts 9, the intermediate ones of which may be extended through the lower plane 8′ and built into the sides of the body of the fuselage 5.

Suitably supported by the intermediate struts 9 and between the latter is an engine fuselage 10 which is of considerably less length than the planes, and which is adapted to carry any suitable or preferred form of driving mechanism for the propeller 11 which is disposed vertically between the planes at the forward end of the engine fuselage 10 and adjacent the forward end of the planes. The struts 9 may be suitably braced as at 12, and a tapered rearwardly widening vertical tail rudder is fixed between the rear ends of the planes 8′ and 8 as clearly shown in Figure 1, a movable tail rudder being provided as at 14 at the rear end of the stationary rudder 13 and adapted to be suitably controlled for determining the lateral course of the aeroplane. Horizontal rudders 15 are also provided at the rear ends of each of the planes 8′ and 8 as clearly shown in Figures 1 and 2.

Figure 4:
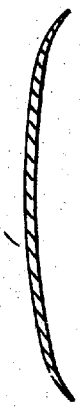
Figure 4 is a transverse sectional view taken on line 4—4 of Figure 1.
Figure 5:
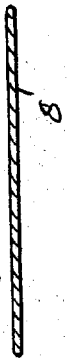
Figure 5 is a view similar to Figure 4 taken on line 5—5 of Figure 1.
Figure 3:
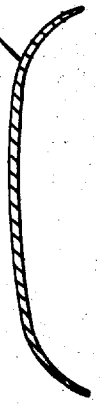
Figure 3 is a transverse sectional view taken on line 3—3 of Figure 1.

The form of each of the planes 8′ and 8 is substantially the same, and will be readily apparent from the drawings, particularly Figures 3 to 5 inclusive. As shown, these planes are transversely curved so as to provide concavities at the undersides thereof, which concavities are of maximum depth at the forward ends of the planes and gradually taper narrower and shallower toward the rear of the aeroplane where they assume a flat form as shown in Figure 5, and the forward ends of these planes are preferably formed with lips as at 16 to give the desired streamline effect. This streamline effect will of course be embodied in the construction of the fuselage 5, also.

Figure 2:
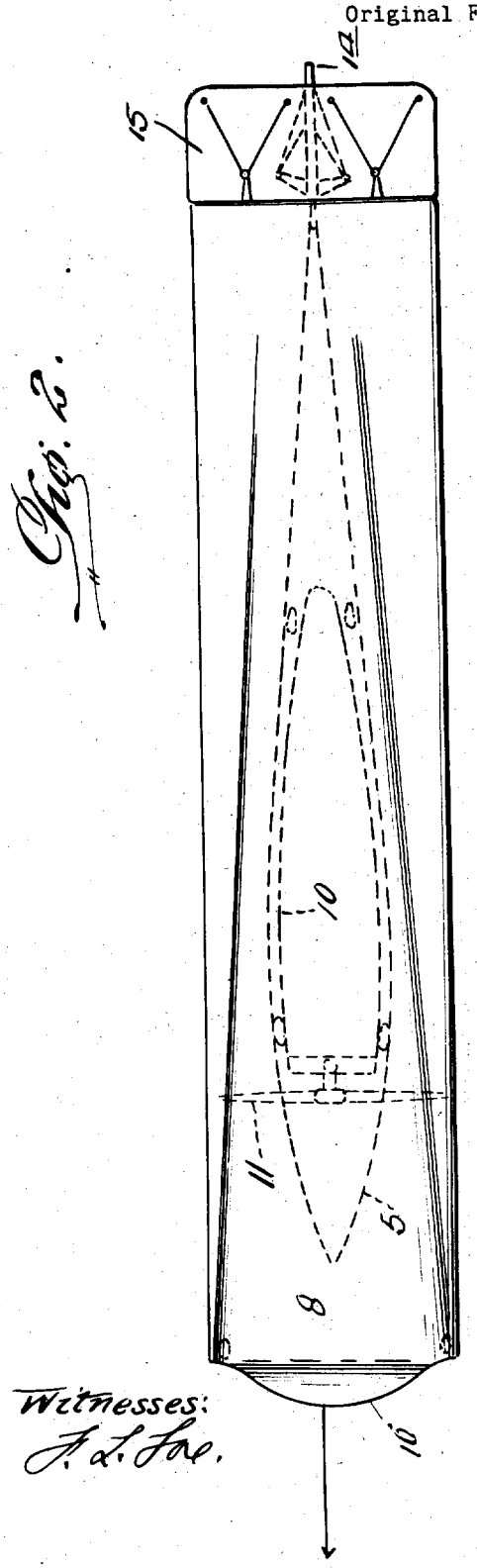
Figure 2 is a top plan view of the device shown in Figure 1.

Particular attention is called to the wing or plane curvature. These wings or planes are formed at their forward ends with a cross section as shown in Figure 3 conforming to one half of an elongated ellipse, and the points of greatest curvature at the sides of the planes converge rearwardly toward the center as shown in Figures 2 and 4 and assume a flat form as shown in Figure 5 at their rear ends.

It is believed that the construction and operation as well as the advantages of the invention will be readily apparent to those skilled in the art from the foregoing description.

What I claim and desire to secure by Letters Patent is:—

1. An aeroplane comprising a fuselage having at least one plane of elongated form extending longitudinally thereof, an engine operatively carrying a propeller, said plane being of upwardly curved form in cross section to provide a longitudinal recess at the under side thereof, said recess being of major depth at the forward end of the plane and gradually tapering shallower toward the rear end of the plane.

2. An aeroplane comprising a fuselage having at least one plane of elongated form extending longitudinally thereof, an engine operatively carrying a propeller, said plane being shaped at its forward end to conform in cross section, to substantially the upper half of an elongated ellipse, with the points of greatest curvature thereof at the sides of the plane and converging rearwardly toward the center, assuming substantially a flat form at the rear end thereof.

3. An aeroplane comprising a main fuselage having rigid upper and lower planes of elongated forms extending longitudinally thereof in spaced relation, an engine fuselage mounted between said planes and supporting a vertical propeller at its forward end between the forward end portion of said planes, said planes being of upwardly curved form in cross section to provide longitudinal recesses at the under sides threof, said recesses being of major depth at the forward ends of the planes and gradually tapering shallower toward the rear ends of the plane, said planes being formed at their forward ends with a cross sectional form conforming to one-half of an elongated ellipse and with the points of greatest curvature thereof at the sides of the planes and converging rearwardly toward the center and assuming a flat form at the rear ends thereof.

In testimony whereof I affix my signature.

ELMER L. CROZIER.